United States Patent [19]

Hoppe et al.

[11] 4,447,486

[45] May 8, 1984

[54] SURFACE-SEALED MOLDINGS OF CELLULAR POLYURETHANE ELASTOMERS AND A PROCESS FOR THEIR PRODUCTION

[75] Inventors: Hans-Georg Hoppe, Leichlingen; Paul Henrichs, Bergisch-Gladbach, both of Fed. Rep. of Germany

[73] Assignee: Bayer Aktiengesellschaft, Leverkusen, Fed. Rep. of Germany

[21] Appl. No.: 303,754

[22] Filed: Sep. 21, 1981

Related U.S. Application Data

[63] Continuation of Ser. No. 171,211, Jul. 22, 1980, abandoned.

[30] Foreign Application Priority Data

Aug. 2, 1979 [DE] Fed. Rep. of Germany ....... 2931469

[51] Int. Cl.$^3$ .......................... B32B 3/26; B32B 27/40
[52] U.S. Cl. .................................. 428/318.6; 428/339; 428/423.3
[58] Field of Search ............... 428/318.6, 318.8, 319.3, 428/319.7, 319.1, 308.4, 306.6, 339, 68, 71, 76, 309.9, 315.7, 315.9, 423.3

[56] References Cited

U.S. PATENT DOCUMENTS

| | | | |
|---|---|---|---|
| 2,908,943 | 10/1959 | Miller | 264/46.6 |
| 3,259,673 | 7/1966 | Ericson | 264/46.6 |
| 3,381,999 | 5/1968 | Steere | 264/129 |
| 3,487,134 | 12/1969 | Burr | 264/46.6 |
| 3,605,848 | 9/1971 | Lombardi et al. | 264/46.6 |
| 3,702,711 | 11/1972 | Beckley | 428/316.6 |
| 3,752,695 | 8/1973 | Finelli | 428/318.8 |
| 3,795,722 | 3/1974 | Sassaman | 264/46.6 |
| 3,873,407 | 3/1975 | Kumata et al. | 428/318.6 |
| 3,888,502 | 6/1975 | Felzer et al. | 428/319.1 |
| 4,232,085 | 11/1980 | Carlstrom et al. | 428/318.8 |
| 4,242,410 | 12/1980 | König et al. | 264/46.6 |
| 4,294,880 | 10/1981 | Nishida | 428/318.8 |
| 4,389,454 | 6/1983 | Horacek et al. | 428/318.6 |

OTHER PUBLICATIONS

Zwolinski, L. M. "Molded Integral-Skin Urethane Foam", SPE Journal, vol. 25, Sep. 1969, pp. 24≧27.

Primary Examiner—William J. Van Balen
Attorney, Agent, or Firm—Gene Harsh; Joseph C. Gil; Lyndanne M. Whalen

[57] ABSTRACT

The present invention relates to moldings, particularly in the form of cushioning elements, of at least partly open-cell polyurethane elastomers which have a substantially homogeneous density profile and a density of from 0.3 to 0.8 g/cc and which are characterized in that their surface is sealed by a continuous, tight, nonporous skin of polyurethane or polyurethane urea having a thickness of from 0.05 to 1 mm, preferably from 0.1 to 0.5 mm and, with particular preference, from 0.2 to 0.3 mm.

4 Claims, 1 Drawing Figure

U.S. Patent May 8, 1984 4,447,486
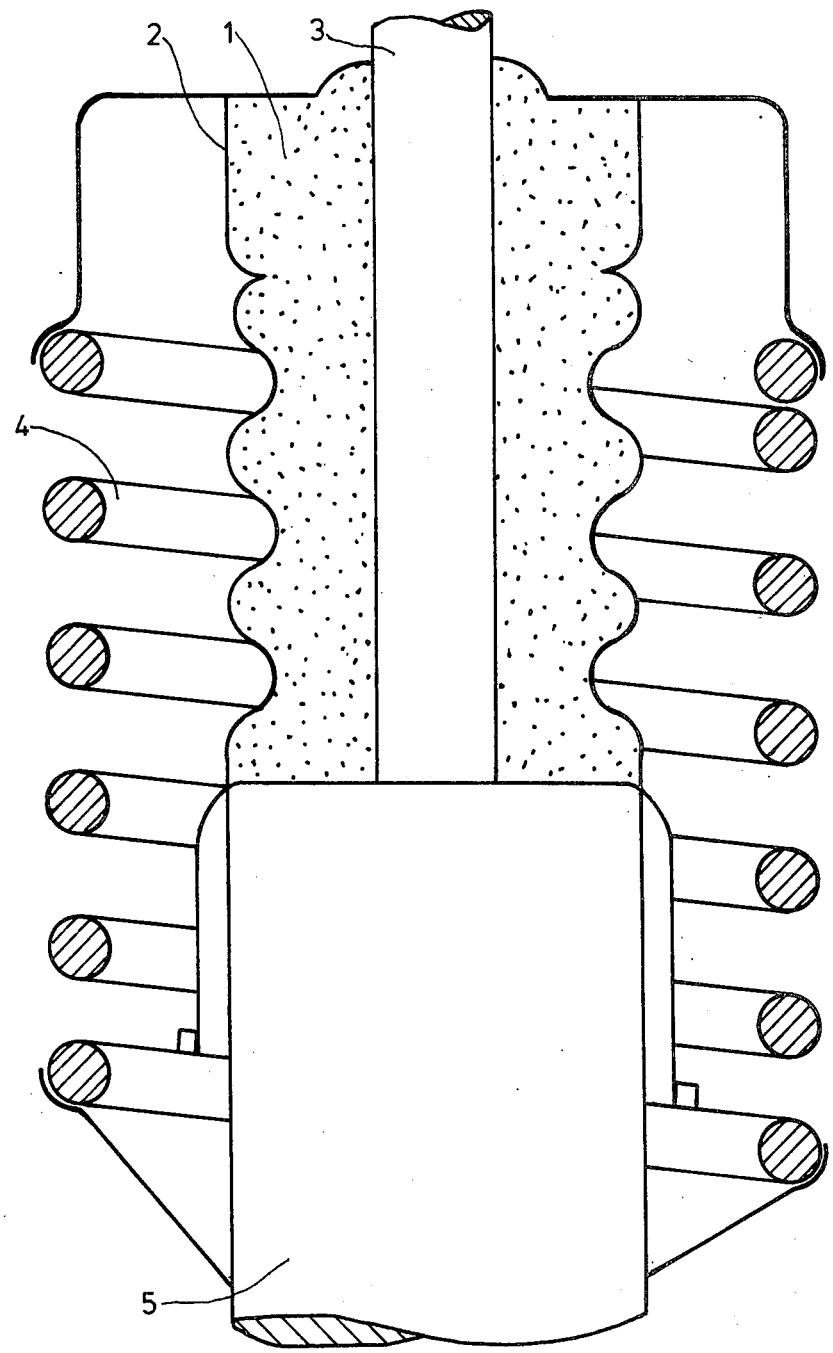

SURFACE-SEALED MOLDINGS OF CELLULAR POLYURETHANE ELASTOMERS AND A PROCESS FOR THEIR PRODUCTION

This application is a continuation of application Ser. No. 171,211, filed 7/22/80, now abandoned.

FIELD OF THE INVENTION

This invention relates to the sealing of substantially open-cell polyurethane elastomers foamed in molds by means of a thin, nonporous, air-impermeable surface skin of polyurethane or polyurethane urea and cushioning elements for shock absorbers produced from such moldings.

BACKGROUND OF THE INVENTION

The sealing of substantially open-cell polyurethane elastomers prevents water, dust and dirt from penetrating into the cellular polyurethane elastomer, surprisingly without affecting the physical properties, resilience for example, of the elastomer.

Moldings of cellular polyurethane elastomers are commercially produced in known manner from polyisocyanates, relatively high molecular weight polyhydroxyl compounds, water as chain extender and blowing agent and, optionally, additional chain extending agents. Cellular polyurethane elastomers are distinguished from the polyurethane foams by considerably higher densities (approximately 0.3 to 0.8 g/cc) and improved physical properties. These improvements create new commercial applications for polyurethanes. For example, high quality cellular polyurethane elastomers, such as produced from 1,5-naphthylene diisocyanate, a linear ethane diol polyadipate (molecular weight approximately 2,000) and water, are used commercially inter alia as shock absorbing and damping materials.

One significant field of application is in the motor vehicle industry where materials of the type in question are used primarily for damping and shock absorbing.

The replacement of the rubber auxiliary springs in spring-leg assemblies with auxiliary springs made of cellular polyurethane elastomers is advantageous because of the greater deformability of cellular polyurethanes. Deformations of cellular polyurethanes of up to 80% are quite possible in practice (for example, in auxiliary springs in automobiles).

In automobiles, the cushioning elements made of cellular polyurethane elastomers are fitted onto the piston rod of the shock absorber within the overall spring-leg assembly consisting of shock absorber, helical spring and the damping element of cellular elastomer. With this arrangement, the damping elements are frequently in danger of becoming soiled because splashed water and dirt are able to penetrate into the damping elements because of their predominantly open-cell pore structure. This can give rise to changes in the cushioning effect, especially at low temperatures. Additionally, the piston rod of the shock absorber also undergoes premature corrosion and wear under the influence of water and dirt held in the damping elements.

The object of the present invention is to provide cushioning elements which may be produced from known formulations and by means of the processing machines normally used in practice which not only show the known favorable cushioning properties, but are also water-tight.

It has now been found that this object may be achieved by providing the known damping elements of elastomeric cellular polyurethane with a tight, impervious skin of polyurethane or polyurethane urea.

Cellular polyurethane elastomers differ from integral foams in that their density is substantially uniform over their entire cross section. Although a tighter outer layer may be obtained by lowering the molding temperature, this adversely affects the cushioning behavior and uniformity of the articles. In addition, the lowering of the molding temperature does not afford complete protection against penetrating moisture and particles of dirt because the outer layer thus produced is not completely pore-free.

It had been assumed that a separately produced, tight surface skin on the damping element would also affect its cushioning behavior because an impervious skin applied to the foam would deprive it of its ability to breathe which results from the open-pore cell structure.

However, it has surprisingly been found that the cushioning behavior of the damping element is not affected by such an outer skin.

DESCRIPTION OF THE INVENTION

Accordingly, the present invention relates to moldings, particularly in the form of cushioning elements, of at least partly open-cell polyurethane elastomers which have a substantially homogeneous density profile and a density of from 0.3 to 0.8 g/cc and which are characterized in that their surface is sealed by a continuous, tight, nonporous skin of polyurethane or polyurethane urea having a thickness of from 0.05 to 1 mm, preferably from 0.1 to 0.5 mm and, with particular preference, from 0.2 to 0.3 mm.

The present invention also relates to a process for producing the surface-sealed moldings according to the instant invention in which either:

(a) the molding consisting of an at least partly open-cell polyurethane elastomer having a substantially homogeneous density profile and a density of from 0.3 to 0.8 g/cc is provided with a tight skin by dip-coating or spray-coating with a one-component or two-component polyurethane lacquer or, preferably with an aqueous polyurethane solution or dispersion, followed by drying, or preferably (b) the inside of a closeable mold is spray-coated with a one-component or two-component polyurethane lacquer or with an aqueous polyurethane solution or dispersion and the coating thus obtained is left to react or dry to form a tight skin, after which the molding having a substantially homogeneous density profile and a density of from 0.3 to 0.8 g/cc is produced in the mold thus pretreated by introducing into the mold a reaction mixture of (i) relatively high molecular polyhydroxyl compounds and organic isocyanates or NCO prepolymers produced from these components, (ii) water and optionally (iii) organic chain extending agents, optionally together with other additives and auxiliaries known per se in polyurethane chemistry. The quantitative ratios between the reactants are selected so that an isocyanate index of from 100 to 115 is attained. The total quantity of the reaction mixture introduced into the mold is selected so that the resulting molding has a density of from 0.3 to 0.8 g/cc, after which the mold is closed and the reaction mixture left to react at temperatures in the range of from 60 to 110° C.

For producing the cushioning elements of foamed PUR elastomers, it is possible, in principle, to use any polyisocyanates known per se. For example, those polyisocyanates described in W. Siefken in Justus Liebigs Annalen der Chemie, 562, pages 75 to 136 may be used. Examples of these correspond to the formula $$Q(NCO)_n$$

in which
- n=2-4, preferably 2, and
- Q represents an aliphatic hydrocarbon radical containing from 2 to 18, preferably from 6 to 10, carbon atoms; a cycloaliphatic hydrocarbon radical containing from 4 to 15, preferably from 5 to 10, carbon atoms; an aromatic hydrocarbon radical containing from 6 to 15, preferably from 6 to 13, carbon atoms; or an araliphatic hydrocarbon radical containing from 8 to 15, preferably from 8 to 13, carbon atoms.

Specific examples of this type of compound are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers. Additional examples are 1-isocyanato-3,3,5-trimethyl-5-isocyanatomethyl cyclohexane (German Auslegeschrift 1,202,785 and U.S. Pat. No. 3,401,190); 2,4- and 2,6-hexahydrotolylene diisocyanate and mixtures of these isomers. Hexahydro-1,3- and/or -1,4-phenylene diisocyanate; perhydro-2,4'-and/or -4,4'-diphenylmethane diisocyanate; 1,3- and 1,4-phenylene diisocyanate; 2,4- and 2,6-tolylene diisocyanate and mixtures of these isomers are also suitable. Diphenylmethane-2,4'- and/or -4,4'-diisocyanate or naphthylene-1,5-diisocyanate are still more examples of these suitable types of polyisocyanates.

It is also possible, for example, to use triphenylmethane-4,4',4''-triisocyanate; polyphenyl polymethylene polyisocyanates of the type obtained by condensing aniline with formaldehyde, followed by phosgenation and described, for example, in British Patents 874,430 and 848,671. Also suitable are m- and p-isocyanatophenyl sulfonyl isocyanates according to U.S. Pat. No. 3,454,606; perchlorinated aryl polyisocyanates of the type described, for example, in German Auslegeschrift 1,157,601 and U.S. Pat. No. 3,277,138 as well as polyisocyanates containing carbodiimide groups of the type described in German Pat. No. 1,092,007 and U.S. Pat. No. 3,152,162 and German Offenlegungsschriften 2,504,400; 2,537,685 and 2,552,350. Also suitable are norbornane diisocyanates according to U.S. Pat. No. 3,492,330; polyisocyanates containing allophanate groups of the type described, for example, in British Pat. 994,890, Belgian Pat. No. 761,626 and Dutch Patent Application 7,102,524. Polyisocyanates containing isocyanurate groups of the type described, for example, in U.S. Pat. No. 3,001,973, German Pat. Nos. 1,022,789; 1,222,067 and 1,027,394 and German Offenlegungsschriften 1,929,034 and 2,004,048 are also suitable. Polyisocyanates containing urethane groups of the type described, for example, in Belgian Pat. No. 752,261 or U.S. Pat. Nos. 3,394,164 and 3,644,457; polyisocyanates containing acylated urea groups according to German Pat. No. 1,230,778; polyisocyanates containing biuret groups of the type described, for example, in U.S. Pat. Nos. 3,124,605 and 3,201,372 and British Pat. No. 889,050 are further suitable examples. Still further examples are polyisocyanates produced by telomerization reactions of the type described, for example, in U.S. Pat. No. 3,654,106; polyisocyanates containing ester groups of the type described, for example, in British Pat. Nos. 965,474 and 1,072,956, U.S. Pat. No. 3,567,763 and German Pat. No. 1,231,688; reaction products of the above-mentioned diisocyanates with acetals according to German Pat. No. 1,072,385 and polyisocyanates containing polymeric fatty acid esters according to U.S. Pat. No. 3,455,883.

It is also possible to use the isocyanate group-containing distillation residues obtained in the commercial production of isocyanates, optionally in solution in one or more of the above-mentioned polyisocyanates. It is also possible to use any mixtures of the above-mentioned polyisocyanates. It is preferred to use aromatic diisocyanates such as 1,5-naphthylene diisocyanate; 4,4'-diisocyanatodiphenylmethane; 2,4- and 2,6-tolylene diisocyanate and mixtures thereof. Of these, 4,4'-diisocyanatodiphenylmethane and, above all, 1,5-naphthylene diisocyanate are particularly preferred.

The relatively high molecular weight polyhydroxyl compounds used are preferably compounds containing an average of 2 to 3 hydroxyl groups and having a molecular weight from 400 to 6,000, more particularly from 800 to 4,000. Examples of these kinds of compounds are polyesters, polyethers, polythioethers, polyacetals, polycarbonates and polyester amides of the type commonly used for the production of homogeneous and cellular polyurethanes.

The polyesters containing hydroxyl groups suitable for use in the instant invention are, for example, reaction products of polyhydric, preferably dihydric alcohols which may be mixed with trihydric alcohols, with polybasic, preferably dibasic, carboxylic acids. Instead of using the free polycarboxylic acids, it is also possible to use the corresponding polycarboxylic acid anhydride or corresponding polycarboxylic acid esters of lower alcohols or mixtures thereof for producing the polyesters. The polycarboxylic acids may be aliphatic, cycloaliphatic, aromatic and/or heterocyclic and may be substituted, for example, by halogen atoms and/or unsaturated.

Examples of carboxylic acids such as these and their derivatives are succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimerized and trimerized unsaturated fatty acids which may be used in admixture with monomeric unsaturated fatty acids such as oleic acid; terephthalic acid dimethyl ester and terephthalic acid-bis-glycol ester. Suitable polyhydric alcohols are, for example, ethylene glycol; 1,2- and 1,3-propylene glycol; 1,4- and 2,3-butylene glycol; 1,6-hexane diol; 1,8-octane diol; neopentyl glycol; 1,4-bis-hydroxymethyl cyclohexane; 2-methyl-1,3-propane diol; glycerol; trimethylol propane; 1,2,6-hexane triol; 1,2,4-butane triol; trimethylol ethane; pentaerythritol; quinitol; mannitol and sorbitol; formitol; methyl glycoside; also diethylene glycol; triethylene glycol; tetraethylene glycol and higher polyethylene glycols; dipropylene glycol and higher polypropylene glycols; dibutylene glycol and higher polybutylene glycols. The polyesters may contain terminal carboxyl groups. Polyesters of lactones, for example ϵ-caprolactone, or of hydroxy carboxylic acids, for example ω-hydroxy caproic acid, may also be used.

Polyethers containing at least 2, generally 2 to 8 and preferably 2 to 3 hydroxyl groups suitable for use in the instant invention are also known and are obtained, for example, by polymerizing epoxides on their own, for example, in the presence of Lewis catalysts or by the addition of these epoxides, preferably ethylene oxide and propylene oxide, either in admixture or successively, with starter components containing reactive hydrogen atoms. Examples of suitable epoxides are ethylene oxide, propylene oxide, butylene oxide, tetrahydrofuran, styrene oxide and epichlorohydrin. Examples of starter components are water, alcohols, ammonia or amines. Specific examples include ethylene glycol; 1,3-propylene glycol or 1,2-propylene glycol; trimethylol propane; glycerol; sorbitol; 4,4'-dihydroxy diphenylpropane; aniline; ethanolamine or ethylene diamine. Sucrose polyethers of the type described, for example, in German Auslegeschriften 1,176,358 and 1,064,938 and formitol- or formose-started polyethers (German Offenlegungsschriften 2,639,083 and 2,737,951) may also be used in the instant invention. In many cases, it is preferred to use polyethers which predominantly contain primary hydroxyl groups (up to 90% by weight, based on all of the hydroxyl groups present in the polyether). Polybutadienes containing hydroxyl groups are also suitable for use in the instant invention.

Among the polythioethers, particular reference is made to the condensation products of thiodiglycol on its own and/or with other glycols, dicarboxylic acids, formaldehyde, aminocarboxylic acids or amino alcohols. Depending on the co-components, the products in question are, for example, polythio mixed ethers, polythioether esters or polythioether ester amides.

Suitable polyacetals are, for example, the compounds obtainable from glycols such as diethylene glycol; triethylene glycol; 4,4'-dioxethoxy diphenyl dimethyl methane; hexane diol and formaldehyde. Polyacetals suitable for use in the instant invention may also be obtained by polymerizing cyclic acetals such as, for example, trioxane (German Offenlegungsschrift 1,694,128).

Suitable polycarbonates containing hydroxy groups can be obtained, for example, by reacting diols such as 1,3-propane diol; 1,4-butane diol and/or 1,6-hexane diol; diethylene glycol; triethylene glycol; tetraethylene glycol or thiodiglycol with diaryl carbonates, for example diphenyl carbonate, or phosgene (German Auslegeschriften 1,694,080; 1,915,908 and 2,221,751, German Offenlegungsschrift 2,605,024).

The polyester amides and polyamides include, for example, the predominantly linear condensates obtained, for example, from polybasic saturated or unsaturated carboxylic acids or their anhydrides and polyhydric saturated or unsaturated amino alcohols, diamines, polyamines and mixtures thereof.

Polyhydroxyl compounds already containing urethane or urea groups and natural polyols which may be modified such as castor oil or carbohydrates, for example starch, may also be used.

Before they are used in the polyisocyanatepolyaddition process, the above-mentioned polyhydroxyl compounds may be modified in various ways. For example, according to German Offenlegungsschriften 2,210,839 (U.S. Pat. Nos. 3,849,515) and 2,544,195, a mixture of different polyhydroxyl compounds (for example, a polyether polyol and a polyester polyol) may be condensed by etherification in the presence of a strong acid to form a relatively high molecular weight polyol which is made up of different segments attached through ether bridges. It is also possible, for example, following German Offenlegungsschrift 2,559,372, to introduce amide groups into the polyhydroxyl compounds or, following German Offenlegungsschrift 2,620,487, to introduce triazine groups by reaction with polyfunctional cyanic acid esters. The reaction of a polyol with a less than equivalent quantity of a diisocyanato-carbodiimide followed by reaction of the carbodiimide group with an amine, amide, phosphite or carboxylic acid, gives polyhydroxyl compounds containing guanidine, phosphonoformamidine or acyl urea groups as described in German Offenlegungsschriften 2,714,289; 2,714,292 and 2,714,293. In some cases, it is advantageous to completely or partly convert the relatively high molecular weight polyhydroxyl compounds into the corresponding anthranilic acid esters by reaction with isatoic acid anhydride as described in German Offenlegungsschriften 2,019,432 and 2,619,840 and in U.S. Pat. Nos. 3,808,250; 3,975,428 and 4,016,143. Relatively high molecular weight compounds containing terminal aromatic amino groups are obtained in this way.

It is also possible to use polyhydroxyl compounds containing high molecular weight polyadducts and polycondensates or polymers in finely disperse or dissolved form. Polyhydroxyl compounds such as these are obtained, for example, by carrying out polyaddition reactions, for example reactions between polyisocyanates and aminofunctional compounds. These polyhydroxyl compounds can also be obtained by polycondensation reactions, for example between formaldehyde and phenol and/or amines, in situ in the above-mentioned compounds containing hydroxyl groups. Processes such as these are described, for example, in German Auslegeschriften 1,168,075 and 1,260,142 and in German Offenlegungsschriften 2,324,134; 2,423,984; 2,152,385; 2,513,815; 2,550,796; 2,550,797; 2,550,833; 2,550,862; 2,633,293 and 2,639,254. However, it is also possible, following U.S. Pat. No. 3,869,413 or German Offenlegungsschrift 2,550,860, to mix an aqueous polymer dispersion with a polyhydroxyl compound and subsequently to remove the water from the resulting mixture.

Polyhydroxyl compounds modified by vinyl polymers of the type obtained, for example, by polymerizing styrene and acrylonitrile in the presence of polyethers as described in U.S. Pat. Nos. 3,383,351; 3,304,273; 3,110,695; 3,523,093 and German Auslegeschrift 1,152,536 or polycarbonate polyols as described in German Pat. No. 1,769,795 and U.S. Pat. No. 3,637,909 are also suitable for use in the instant process. Plastics having particularly good flameproof properties are obtained by using polyether polyols modified in accordance with German Offenlegungsschriften 2,442,101; 2,644,922 and 2,646,141 by graft polymerization with vinyl phosphonic acid esters and, optionally, (meth)acrylonitrile, (meth)acrylamide or OH-functional (meth)acrylic acid esters.

Where modified polyhydroxyl compounds of the type mentioned above are used as starting components in the polyisocyanate-polyaddition process, polyurethanes having considerably improved mechanical properties are formed in many cases.

Representatives of the above-mentioned compounds useful in the instant invention are described, for example, in High Polymers, Volume XVI, "Polyurethane, Chemistry and Technology" Saunders-Frisch, Interscience Publishers, New York/London, Volume I, 1962, pages 32 to 42 and pages 44 to 54 and Volume II, 1964, pages 5-6 and 198-199, and in Kunststoff-Handbuch, Volume VII, Vieweg-Hochtlen, Carl-Hanser-Verlag, Munich, 1966, for example on pages 45 to 71. It is, of course, also possible to use mixtures of the above-mentioned polyols, for example mixtures of polyethers and polyesters.

The chain extending agents which may be used in the instant invention are compounds containing at least two isocyanate-reactive hydrogen atoms and having a molecular weight of from 32 to 400.

It is also possible to use mixtures of different compounds containing at least two isocyanate-reactive hydrogen atoms and having a molecualr weight in the range from 32 to 400.

Examples of compounds such as these are ethylene glycol; 1,2- and 1,3-propylene glycol; 1,4- and 2,3-butylene glycol; 1,5-pentane diol; 1,6-hexane diol; 1,8-octane diol; neopentyl glycol; 1,4-bis-hydroxymethyl cyclohexane; 2-methyl-1,3-propane diol and dibromobutene diol (U.S. Pat. No. 2,723,392). Further examples are glycerol; trimethylol propane; 1,2,6-hexane triol; trimethylol ethane; pentaerythritol; quinitol; mannitol and sorbitol. Castor oil; diethylene glycol; triethylene glycol; tetraethylene glycol, higher polyethylene glycols having a molecular weight of up to 400; dipropylene glycol, higher polypropylene glycols having a molecular weight of up to 400; dibutylene glycol, higher polybutylene glycols having a molecular weight of up to 400; 4,4-dihydroxy diphenylpropane; dihydroxy methyl hydroquinone; ethanolamine; diethanolamine; N-methyl diethanolamine and triethanolamine are also suitable examples.

Other low molecular weight polyols suitable for use in the instant invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschriften 2,639,084; 2,714,084; 2,714,104; 2,721,186; 2,738,154 and 2,738,512). In order to obtain plastics with improved flame resistance, these formoses are advantageously used in combination with aminoplast formers and/or phosphites as described in German Offenlegungsschriften 2,738,513 and 2,738,532. Solutions of polyisocyanate-polyaddition products, particularly solutions of polyurethane ureas containing ionic groups and/or solutions of polyhydrazodicarbonamides, in low molecular weight polyhydric alcohols may also be used as the polyol component in the instant invention as described in German Offenlegungsschrift 2,638,759.

Aliphatic diamines suitable for use as crosslinking agents are, for example, ethylene diamine; 1,4-tetramethylene diamine; 1,11-undecamethylene diamine; 1,12-dodecamethylene diamine and mixtures thereof; 1-amino-3,3,5-trimethyl-5-aminomethyl cyclohexane ("isophorone diamine"); 2,4- and 2,6-hexahydrotolylene diamine and mixtures thereof. Additional suitable examples are perhydro-2,4'- and 4,4'-diaminodiphenylmethane; p-xylylene diamine; bis-(3-aminopropyl)-methylamine; diamino-perhydroanthracenes as described in German Offenlegungsschrift 2,638,731 and cycloaliphatic triamines according to German Offenlegungsschrift 2,614,244. It is also possible in the instant invention to use hydrazine and substituted hydrazines, for example methyl hydrazine; N,N'-dimethyl hydrazine and their homologs. Also suitable are the acid dihydrazides, for example carbodihydrazide, oxalic acid dihydrazide, the dihydrazides of malonic acid, succinic acid, glutaric acid, adipic acid, β-methyl adipic acid, sebacic acid, hydracrylic acid and terephthalic acid. Semicarbazido alkylene hydrazides such as, for example, βsemicarbazido propionic acid hydrazide as described in German Offenlegungsschrift 1,770,591, semicarbazido alkylene carbazinic esters such as, for example, 2-semicarbazido ethyl carbazinic ester as described in German Offenlegungsschrift 1,918,504 or even amino-semicarbazide compounds such as, for example, β-amino-ethyl semicarbazido carbonate as described in German Offenlegungsschrift 1,902,931 are also suitable cross-linking agents in the instant invention. To control their reactivity, the amino groups may be completely or partly blocked by aldimine or ketimine groups as described in U.S. Pat. No. 3,734,894 and German Offenlegungsschrift 2,637,115.

Examples of suitable aromatic diamines are bisanthranilic acid esters according to German Offenlegungsschriften 2,040,644 and 2,160,590, 3,5- and 2,4-diamino benzoic acid esters according to German Offenlegungsschrift 2,025,900. Also suitable are the diamines containing ester groups described in German Offenlegungsschriften 1,803,635 (U.S. Pat. Nos. 3,681,290 and 3,736,350); 2,040,650 and 2,160,598 and the diamines containing ether groups according to German Offenlegungsschriften 1,770,525 and 1,809,172 (U.S. Pat. Nos. 3,654,364 and 3,736,295). Further examples of suitable aromatic diamines are the 2-halogen-1,3-phenylene diamines which may be substituted in the 5-position as described in German Offenlegungsschriften 2,011,722; 2,025,896 and 2,065,869; 3,3'-dichloro-4,4'-diamino-diphenylmethane; tolylene diamine; 4,4'-22; 2,025,896 and 2,065,869; 3,3'-dichloro-4,4'-diamino-diphenylmethane; tolylene diamine; 4,4'-diamino-diphenylmethane; 4,4'-diamino-diphenyl disulfides as described in German Offenlegungsschrift 2,404,976, diaminodiphenyl dithioethers as described in German Offenlegungsschrift 2,509,404 and aromatic diamines substituted by alkyl thio groups as described in German Offenlegungsschrift 2,638,760. Additional examples are diamino-benzene phosphonic acid esters as described in German Offenlegungsschrift 2,459,491, aromatic diamines containing sulfonate or carboxylate groups as described in German Offenlegungsschrift 2,720,166 and the high melting diamines described in German Offenlegungsschrift 2,635,400. Examples of aliphatic-aromatic diamines are the aminoalkyl thio-anilines according to German Offenlegungsschrift 2,734,574.

Examples of organic blowing agents which may be used and information on the use of blowing agents can be found in Kunststoff-Handbuch, Volume VII, by Vieweg-Hochtlen, Carl-Hanser-Verlag, Munich, 1966, for example, on pages 108 and 109, 453 to 455 and 507 to 510.

Catalysts known per se may be used in the production of the moldings. Examples of such catalysts are, for example, tertiary amines such as triethylamine; tributylamine; N-methyl morpholine; N-ethyl morpholine; N,N,N',N'-tetramethyl ethylene diamine; pentamethyl diethylene triamine and higher homologs as described in German Offenlegungsschriften 2,624,527 and 2,624,528. Additional examples of suitable catalysts are 1,4-diazabicyclo-(2,2,2)-octane; N-methyl-N'-dimethylaminoethyl piperidine; bis-(dimethyl-aminoalkyl)-piperazines as described in German Offenlegungsschrift 2,636,787; N,N-dimethyl benzylamine; N,N-dimethyl cyclohexylamine; N,N-diethyl benzylamine; bis-(N,N-diethyl-aminoethyl)adipate; N,N,N',N'-tetramethyl-1,3-butane diamine; N,N-dimethyl-β-phenyl ethylamine; 1,2-dimethylimidazole; 2-methylimidazole, monocyclic and bicyclic amidines as described in German Offenlegungsschrift 1,720,633. Further examples are bis-(dialkylamino)-alkyl ethers as described in U.S. Pat. No. 3,330,782; German Auslegeschrift 1,030,558 and German Offenlegungsschriften 1,804,361 and 2,618,280 and tertiary amines containing amide groups, preferably formamide groups, according to German Offenlegungsschriften 2,523,633 and 2,732,292. Suitable catalysts are also Mannich bases known per se of secondary amines such as dimethylamine and aldehydes, preferably formaldehyde, or ketones such as acetone, methylethyl ketone or cyclohexanone and phenols such as phenol, nonyl phenol or bisphenol.

Tertiary amines containing isocyanate-reactive hydrogen atoms suitable for use as catalysts are, for example, triethanolamine; triisopropanolamine; N-methyl diethanolamine; N-ethyl diethanolamine; N,N-dimethyl ethanolamine; their reaction products with alkylene oxides such as propylene oxide and/or ethylene oxide and also secondary tertiary amines according to German Offenlegungsschrift 2,732,292.

Other suitable catalysts are sila-amines containing carbon silicon bonds of the type described, for example, in German Patent No. 1,229,290 corresponding to U.S. Pat. No. 3,620,984, for example 2,2,4-trimethyl-2-silamorpholine and 1,3-diethylaminomethyl tetramethyl disiloxane.

It is also possible to use organo-metallic compounds, particularly organo-tin compounds, as catalysts. In addition to sulfur-containing compounds such as di-n-octyl tin mercaptide as described in German Auslegeschrift 1,769,367 and U.S. Pat. No. 3,654,927, preferred organo-tin compounds are tin(II) salts of carboxylic acids such as tin(II) acetate; tin(II) octoate; tin(II) ethyl hexoate and tin(IV) laurate and tin(IV) compounds, for example, dibutyl tin oxide; dibutyl tin dichloride; dibutyl tin diacetate; dibutyl tin dilaurate; dibutyl tin maleate or dioctyl tin diacetate.

The catalysts are often used in a quantity of from about 0.001 to 10% by weight, based on the total reaction mixture.

Surface active additives such as emulsifiers and foam stabilizers may also be used. Suitable emulsifiers are, for example, the sodium salts of castor oil sulfonates or salts of fatty acids with amines such as diethylamine oleate or diethanolamine stearate. Alkali or ammonium salts of sulfonic acids such as, for example, dodecyl benzene sulfonic acid or dinaphthyl methane disulfonic acid or of fatty acids such as ricinoleic acid or of polymeric fatty acids may also be used as surface active additives.

Suitable foam stabilizers are preferably polyether siloxanes, particularly water-soluble types. The structure of these compounds is generally such that a copolymer of ethylene oxide and propylene oxide is attached to a polydimethyl siloxane residue. Foam stabilizers such as these are described, for example, in U.S. Pat. Nos. 2,834,748; 2,917,480 and 3,629,308. In many cases, polysiloxane-polyoxyalkylene copolymers branched through allophanate groups according to German Offenlegungsschrift 2,558,523 are of particular interest.

It is also possible to use known cell regulators such as paraffins or fatty alcohol.

Also pigments or dyes and flameproofing agents known per se, for example tris-chloroethyl phosphate, tricresyl phosphate or ammonium phosphate and polyphosphate and stabilizers against the effects of aging and weather, plasticizers and fungistatic and bacteriostatic substances as well as fillers such as barium sulfate, kieselguar, carbon black or whiting may also be used.

In the instant invention, water is preferably used both as the chain extending agent and as the blowing agent. In addition to water, however, it is also possible to use the chain extending agents mentioned above by way of example. The water is generally used in a quantity of from 0.5 to 2% by weight, based on the total mixture of all the other reactants, and preferably in a quantity of from 0.7 to 1.2% by weight. The water is preferably used in the form of an aqueous solution of an emulsifier of the type mentioned by way of example below. This ensures that the water is thoroughly mixed with the other reactants.

The moldings are preferably produced by the known prepolymer process in which a prepolymer containing isocyanate groups is prepared, preferably from the relatively high molecular weight polyol and the diisocyanate in an NCO/OH equivalent ratio of from 1.5:1 to 3:1, and preferably from 1.8:1 to 2.2:1, and is subsequently reacted with the above-mentioned quantity of water. It is also possible, but by no means preferred, to adopt the known one-shot process and also to work with the organic chain extending agents mentioned by way of example above. Where chain extending agents such as these are used, they are employed in the quantities normally used for the production of polyurethane elastomers. As for the rest, the polyurethane elastomers are produced using the individual reactants in such quantities that an isocyanate index of from 100 to 115 is present. This applies both to the preferred reaction of NCO prepolymers with water and also to the quantitative ratios between the individual reactants in the less preferred one-shot process.

The quantity in which the reaction mixture is introduced into the mold is measured in such a way that the above-mentioned density of from 0.3 to 0.8 g/cc is obtained. The reaction mixtures may be prepared and the mold filled using machines, for example of the type described in U.S. Pat. No. 2,764,565. Information on processing machines which may also be used in the instant invention can be found in Kunststoff-Handbuch, Volume VII, by Vieweg-Hochtlen, Carl-Hanser-Verlag, Munich, 1966, for example on pages 121 to 205.

Suitable mold materials are metals, for example aluminum, or plastics, for example epoxide resin. The foamable reaction mixture foams in the mold and forms the molding.

The formation of the skin on the surface of the molding may be carried out by dip-coating the molding or spray-coating the molding, although it is preferably carried out by spraying the mold itself by the so-called in-mold coating process. It is possible to use any of the known one-component or two-component polyurethane lacquers based on the above-mentioned starting compounds, although it is preferred to use compositions consisting of aliphatic or cycloaliphatic compounds. For ecological reasons and for reasons of pollution control, it is preferred to use aqueous solutions or dispersions or polyurethanes or polyurethane ureas. Ionic and emulsifier-free products are particularly preferred because of superior adhesion.

The one-component and two-component polyurethanes used in the surface sealing process of the instant invention are known per se from the lacquer and coating field. The so-called "two-component poly-urethanes" are reactive systems which consist of, for example, a pre-adduct containing isocyanate groups and a suitable chain extending agent (generally an aromatic diamine) which are applied separately or together, diluted with a solvent, to the molding to be sealed by dip-coating or spray-coating.

Lacquers of this type are described, for example, in German Patent Nos. 838,826 and 872,268, German Auslegeschriften 1,023,449 and 1,240,656 and U.S. Pat. No. 3,281,396 and, in particular, in German Offenlegungsschrift 1,570,525 and U.S. Pat. No. 3,475,266.

Conversely, it is, of course, also possible to synthesize two-component polyurethanes from a low molecular weight polyisocyanate and a relatively high molecular weight pre-adduct which still contains isocyanate-reactive groups. One such system is described, for example, in German Offenlegungsschrift 2,221,756 and U.S. Pat. No. 3,904,796.

In contrast to the two-component polyurethanes which have been known for some time, the so-called one-component polyurethanes represent more recent prior art. These already fully reacted high molecular weight products are obtained by reacting polyhydroxyl compounds, above all dihydroxy polyesters or dihydroxy polyethers, in admixture with glycols, preferably ethylene glycol or butane diol, with aromatic diisocyanates, preferably 4,4'-diphenylmethane diisocyanate. These substantially linear polyurethanes which may be produced both in the melt and also in solution are used in the form of solutions or solvent mixtures containing dimethyl formamide and/or other highly polar compounds. One advantage of the one-component polyurethanes is their virtually unlimited pot life. In addition to the so-called aromatic one-component polyurethanes based on aromatic diisocyanates, the prior art also includes the so-called aliphatic one-component polyurethanes. Polyurethanes such as these are polyurethane ureas of relatively high molecular weight dihydroxy compounds, aliphatic diisocyanates and aliphatic diamines or bis-hydrazides, bis-semicarbazides and bis-carbazinic acid esters as chain extenders. The aliphatic one-component polyurethanes are applied from solvent mixtures which, in addition to aromatic hydrocarbons, contain secondary or primary alcohols.

It is preferred to use aqueous solutions and, more particularly, film-forming aqueous dispersions of polyurethanes or polyurethane ureas of the type known from the coating industry for surface sealing.

The polyurethane dispersions may contain anionic, cationic and/or nonionic dispersion centers and may also contain external emulsifiers.

Suitable aqueous polyurethane dispersions and solutions are described, for example, by D. Dieterich et al in J. Oil Col. Chem. Assoc. 1970, 53, pages 363–379; in Angewandte Makromolekulare Chemie, 1972, 26, pages 85–106; in Angewandte Chemie 1970, 82, pages 53–63; in U.S. Pat. No. 4,086,193 (ionic dispersions) and in German Offenlegungsschriften 2,550,860; 1,495,745 (U.S. Pat. No. 3,479,310); 1,495,770 (U.S. Pat. No. 3,535,274); 1,495,847 (Canadian Pat. 764,009); 1,770,068 (U.S. Pat. No. 3,756,992); 2,314,512; 2,141,807; 2,314,513 and 2,343,294 (U.S. Pat. No. 3,989,869).

In addition, aqueous polyurethane solutions are described in French Pats. 2,308,646 and 2,331,581 and in German Offenlegungsschrift 2,730,514.

Preferred polyurethane dispersions are those of polyhydroxy polyesters, hexane and/or isophorone diisocyanate and ethylene diamine ethyl sulfonate corresponding to the formula $$N_2N-CH_2-CH_2-NH-CH_2-CH_2SO_3-Na.$$

It is frequently preferred to use aqueous polyurethane dispersions or solutions of the type which may subsequently be cross-linked. This may be done, for example, by introducing N-methylol groups, for example by treatment with formaldehyde, which cross-link in known manner, preferably in the presence of acid catalysts, to form methylene groups.

The moldings are surface-sealed by subsequent application of the above-mentioned coating compositions or dispersions to the prefabricated molding or, preferably, by coating the inside of the mold before it is filled with one of the above-mentioned coating compositions or with one of the dispersions exemplified above. After the inner wall of the mold has been coated in this way, the skin is initially formed by leaving the coating to react out or dry. In general, the coating compositions or dispersions are used in such quantities that a tight skin having a thickness of from 0.05 to 1 mm, preferably from 0.1 to 0.5 mm and, with particular preference, from 0.2 to 0.3 mm is formed.

The moldings produced by the instant invention have a tight outer skin and are suitable for use as cushioning elements, shock absorbing elements and seals for motor vehicles, particularly automobiles. In FIG. 1) the construction of a shock absorbing assembly is shown, wherein 1. is a buffer element of a substancially open cell polyurethane elastomer,
2. is a surface sealing on the elastomer (1),
3. is the piston rod of the shock absorber,
4. is a steel helical spring, and
5. is a shock absorber.

The following Examples illustrate the production of cushioning elements of elastomeric cellular polyurethanes and their coating following the instant invention without limiting it in any way. Unless otherwise indicated, the quantities quoted represent parts by weight or percentages by weight. The tests were carried out in mixing machines of the type commonly used for processing liquid polyurethane systems (SK and EZ-AB machines of the type manufactured by the Hennecki Company).

Damping elements having a density of approximately 500 g/dm$^3$ were produced as the moldings in corresponding molds of which the feed openings were closed by a cover through toggle levers. The water absorption of the coated and uncoated damping elements were determined after various degrees of deformation and deformation cycles under water. In addition, the cushioning behavior was measured by the compression test according to DIN 53 577.

A pre-adduct of 24 parts of 1,5-naphthylene diisocyanate and 100 parts of a linear ethane diol polyadipate (molecular weight 2,000) was used for all the Examples.

EXAMPLES

Example 1

(a) Comparison Test 2.15 Parts of a 50% aqueous solution of a fatty acid sulfonate were mixed intensively with 124 parts of the pre-adduct and the resulting mixture introduced into a mold which had been heated to 90° C. In the underwater compression test, the molding obtained after heating for 30 minutes at 90° C. showed considerable water absorption after several deformations at different levels of deformation. The results obtained are set out in Tables 1 and 2.

(b) Process according to the invention

Before introduction of the reactive mixture used in Comparison Test (a), the inner walls of the mold heated to 90° C. had been sprayed with a 40% aqueous PUR dispersion by means of a spray gun, the water evaporating instantaneously to leave a uniform elastic film (0.2 mm) behind on the mold wall. This aqueous dispersion was a reaction product of 240 parts of an adipic acid/-butanediol polyester (molecular weight 2,000), 10 parts of an ethoxylation product of n-butanol (molecular weight 1,700), 15 parts of an addition product of sodium bisulfite with propoxylated butene diol, 5 parts of hydrazine and 100 parts of diphenylmethane diisocyanate. The dispersion had been partially methylolated by reaction with 0.5 part of 30% formalin. The reactive mixture used in Comparison Test (a) was then introduced into the mold thus prepared. The molding obtained after opening of the mold had taken on the polyurethane film with firm adhesion over its entire surface. In the corresponding underwater tests, the resulting damping element showed a considerably reduced water absorption for the same cushioning behavior as in the Comparison Test. The results obtained are set out in Tables 1 and 2.

TABLE 1

Water Absorption After Various Degrees of Deformation (Deformation Rate: 50 mm/minute)

| Test | Deformation (%) | Number of Cycles | Original Molding Dry Weight (g) | Water Absorption (g) | Water Absorption (%) |
|---|---|---|---|---|---|
| (b) | 25 | 5 | 152.448 | 0.777 | 0.51 |
|  | 50 | 5 |  | 1.212 | 0.80 |
|  | 67 | 10 |  | 4.622 | 3.0 |
| (a) | 25 | 5 | 156.130 | 2.543 | 1.60 |
|  | 50 | 5 |  | 3.012 | 1.90 |
|  | 67 | 10 |  | 15.942 | 10.20 |

TABLE 2

Compression Forces at Various Degrees of Deformation (After 10 Deformation Cycles)

| | Deformation (%) | Compression Force N | | Deformation (%) | Compression force N |
|---|---|---|---|---|---|
| coated damping element (b) | 25 | 850 | uncoated damping element (a) | 25 | 990 |
|  | 40 | 1550 |  | 40 | 1690 |
|  | 50 | 2650 |  | 50 | 2700 |
|  | 65 | 8230 |  | 65 | 8600 |

Test Conditions:
Deformation Rate: 50 mm/minute

EXAMPLE 2

The procedure was as in Example 1(b), except that a 40% aqueous dispersion of a polyurethane urea of 300 parts of an adipic acid/hexane diol polyester having a molecular weight of 800, 90 parts of hexamethylene diisocyanate and 15 parts of the following compound:

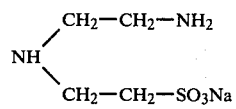

was used. Once again, a molding having a tight outer skin was obtained and, in the underwater compression test, showed a water absorption similar to that of the sealed molding of Example 1b as shown in Table (3).

TABLE 3

Water Absorption After Various Degrees of Deformation (Deformation Rate: 50 mm/minute) and Number of Cycles (Example 2)

| Deformation (%) | Number of Cycles | Water Absorption (%) |
|---|---|---|
| 25 | 5 | 0,39 |
| 50 | 5 | 0,72 |
| 67 | 10 | 2,66 |

What is claimed is:

1. A molding of an at least partly open-cell polyurethane elastomer having a substantially homogeneous density profile and a density of from 0.3 to 0.8 g/cc, characterized in that its surface is sealed with a tight, nonporous skin of polyurethane or polyurethane urea having a thickness of from 0.05 to 1 mm.

2. A cushioning element for a shock-absorbing assembly comprising an at least partly open-cell polyurethane elastomer having a substantially homogeneous density profile and a density of from 0.3 to 0.8 g/cc said elastomer having a surface sealed by a continuous, tight nonporous skin of polyurethane or polyurethane urea said skin having a thickness from 0.05 to 1 mm which skin makes the cushioning element water tight.

3. The cushioning element of claim 2 wherein the polyurethane elastomer is produced by reacting:
    (a) a relatively high molecular weight polyhydroxyl compound,
    (b) an organic isocyanate,
    (c) water, and optionally
    (d) organic chain extending agents and other known additives in a quantity such that the isocyanate index is from 100 to 115 in a closed mold at a temperature from 60° to 110° C.

4. The cushioning element of claim 3 wherein components (a) and (b) are first reacted to form an NCO prepolymer which is subsequently reacted with components (c) and (d).

* * * * *